United States Patent
Iwasaki (10) Patent No.: US 12,484,768 B2
(45) Date of Patent: Dec. 2, 2025

(54) INSERTION DEVICE

(71) Applicant: OLYMPUS MEDICAL SYSTEMS CORP., Tokyo (JP)

(72) Inventor: Seiji Iwasaki, Hachioji (JP)

(73) Assignee: Olympus Medical Systems Corp., Tokyo (JP)

( * ) Notice: Subject to any disclaimer, the term of this patent is extended or adjusted under 35 U.S.C. 154(b) by 337 days.

(21) Appl. No.: 18/122,185

(22) Filed: Mar. 16, 2023

(65) Prior Publication Data

US 2023/0301498 A1 Sep. 28, 2023

Related U.S. Application Data

(60) Provisional application No. 63/323,827, filed on Mar. 25, 2022.

(51) Int. Cl.
*A61B 1/00* (2006.01)
*A61B 1/005* (2006.01)

(52) U.S. Cl.
CPC ........ *A61B 1/0057* (2013.01); *A61B 1/00103* (2013.01)

(58) Field of Classification Search
CPC .............. A61B 1/0057; A61B 1/00103; A61B 1/00098; A61B 1/012; A61B 1/018; A61B 1/00091; A61B 1/00094; A61B 1/015; A61B 1/126
See application file for complete search history.

(56) References Cited

U.S. PATENT DOCUMENTS

| | | | |
|---|---|---|---|
| 5,460,168 A * | 10/1995 | Masubuchi | A61B 1/00098 600/107 |
| 2005/0090709 A1* | 4/2005 | Okada | A61B 17/072 600/153 |
| 2015/0279031 A1* | 10/2015 | Cavusoglu | G06T 7/277 382/103 |
| 2016/0106934 A1 | 4/2016 | Hiraga et al. | |
| 2018/0042460 A1 | 2/2018 | Wake et al. | |
| 2020/0221931 A1 | 7/2020 | Wilder et al. | |
| 2021/0015348 A1 | 1/2021 | Wilder et al. | |
| 2021/0068635 A1 | 3/2021 | Yamanashi et al. | |
| 2021/0076909 A1 | 3/2021 | Ueda et al. | |
| 2021/0121054 A1 | 4/2021 | Ueda et al. | |

FOREIGN PATENT DOCUMENTS

| | | |
|---|---|---|
| JP | H07-184831 A | 7/1995 |
| JP | 2001-218731 A | 8/2001 |
| JP | 3207991 B2 | 9/2001 |
| JP | 3739515 B2 | 1/2006 |
| JP | 2015-029764 A | 2/2015 |
| JP | 5830625 B2 | 12/2015 |

(Continued)

*Primary Examiner* — Timothy J Neal
(74) *Attorney, Agent, or Firm* — Morgan, Lewis & Bockius LLP (57) ABSTRACT

An insertion device comprises an insertion section, the insertion section including a distal portion, an operation section located on a proximal end side of the insertion section, a channel located in the insertion section and communicating with the distal portion, the channel including a transformable member on a distal end side of the channel, and a transformation unit, wherein a shape of the transformable member is changeable by operation of the operation section.

20 Claims, 11 Drawing Sheets

(56) References Cited

FOREIGN PATENT DOCUMENTS

| | | | |
|---|---|---|---|
| JP | 6246417 | B2 | 12/2017 |
| JP | 2020-092917 | A | 6/2020 |
| JP | 2021-104072 | A | 7/2021 |
| JP | 2021-166567 | A | 10/2021 |
| JP | 2022-517104 | A | 3/2022 |
| JP | 2022-540883 | A | 9/2022 |

\* cited by examiner

INSERTION DEVICE

CROSS-REFERENCE TO RELATED APPLICATION

This application is based on and claims priority under 35 U.S.C. § 119 to U.S. Provisional Application No. 63/323,827, filed Mar. 25, 2022, the entire contents of which are incorporated herein by reference.

BACKGROUND

1. Technical Field of the Disclosure

The present disclosure relates to an insertion device having a channel.

2. Description of the Related Art

An endoscope, which is an insertion device, observes a region not visible from outside by inserting an elongated insertion section into a body of a subject, and performs various treatments by inserting a treatment instrument such as a forceps into a channel, which is a tube that allows insertion through the insertion section, and using the treatment instrument protruding from a channel opening on a distal end.

In an endoscope in which a treatment instrument channel also serves as a suction channel, an inner diameter of the treatment instrument channel is set large for the purpose of efficient suctioning.

In addition, in order to use a plurality of treatment instruments, the inner diameter of the treatment instrument channel is set larger than a treatment instrument having the largest outer diameter among the plurality of treatment instruments.

A prior art discloses an endoscope apparatus having a wire which is a transmission member provided to extend to an operation section on a distal end of a cover that covers an insertion section of an endoscope. The wire is pushed and pulled by operation of a wire knob of the operation section to change a direction of a channel distal end.

The prior art discloses a tube body production method for pulling a net tube in a longitudinal direction to reduce the diameter of a tube inserted in the net tube.

The prior art discloses an endoscope that enables an orientation of water feeding of a water feeding conduit to be changed.

SUMMARY

An insertion device according to an aspect of the present disclosure comprises: an insertion section, the insertion section including a distal portion; an operation section located on a proximal end side of the insertion section; a channel located in the insertion section and communicating with the distal portion, the channel including a transformable member on a distal end side of the channel; and a transformation unit (restriction device), wherein a shape of the transformable member is changeable by operation of the operation section.

DETAILED DESCRIPTION

First Embodiment

Figure 1:
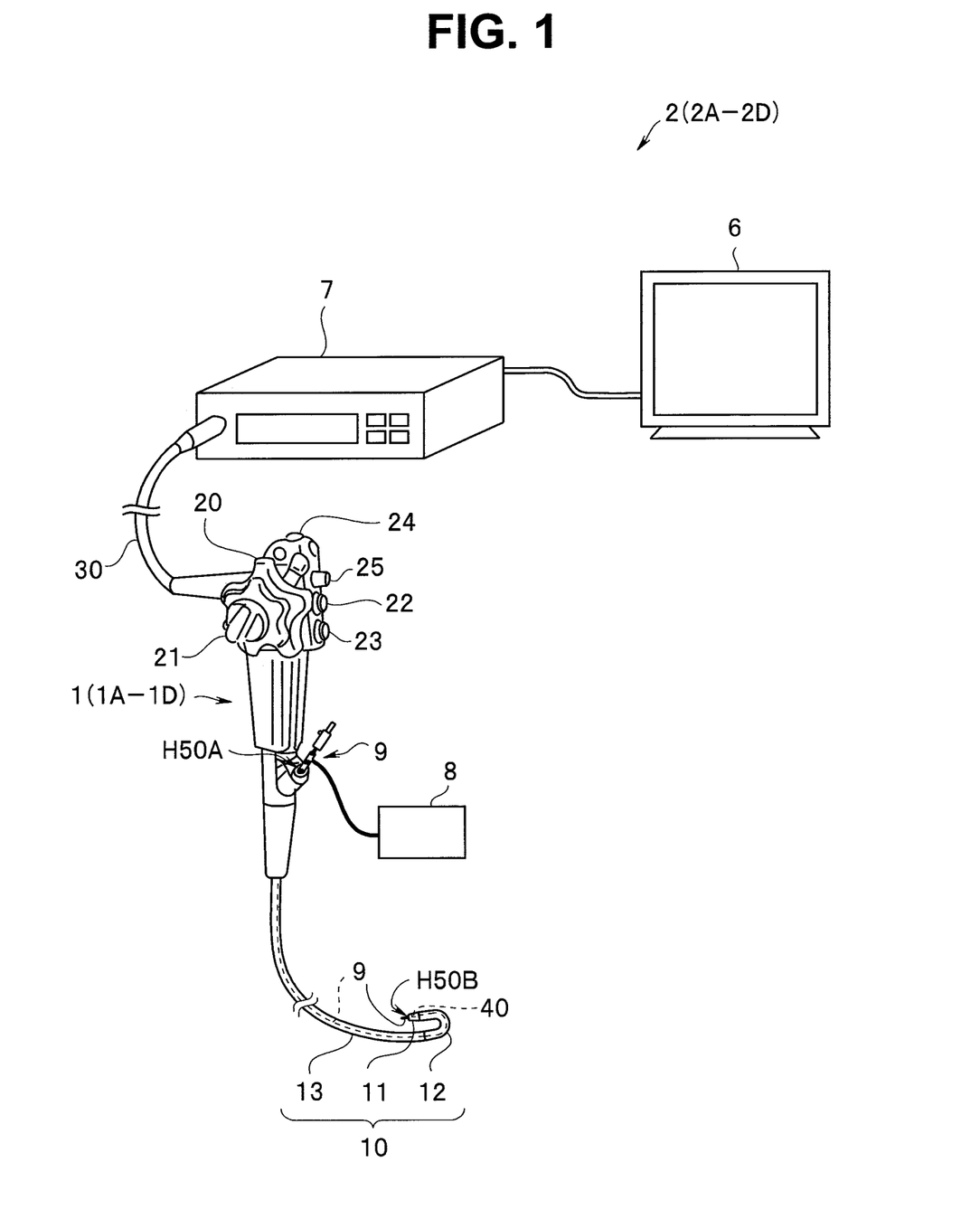
FIG. 1 is a configuration diagram of an endoscope system including an endoscope of an embodiment.

An endoscope 1 which is an insertion device of an embodiment shown in FIG. 1 configures an endoscope system 2 which is the insertion device together with a treatment instrument 9, a monitor 6, a processor 7, and a suction apparatus 8. The endoscope 1 is what is called a single-use endoscope to be disposed of after being used once.

Note that the drawings based on embodiments are schematic ones. A relationship between thicknesses and widths of respective portions in the drawings, the ratio of thicknesses of the respective portions, and the like differ from actual ones. The drawings mutually include portions having dimensional relationships and ratios different from one another. Illustration and provision of reference characters of some components are omitted.

The endoscope 1 includes an insertion section 10 to be inserted in a subject, an operation section 20 disposed on a proximal end side of the insertion section 10, and a universal cord 30 extending from the operation section 20.

In the insertion section 10, a distal end portion 11 in which an image pickup unit 40 is disposed, a bending portion 12 disposed on the proximal end side of the distal end portion 11, and a flexible tube 13 that connects the bending portion 12 and the operation section 20 are provided in a coupled manner.

The operation section 20 is provided with a bending operation dial 21, an air/water feeding button 22, a suction button 23, an operation lever 24, and a plurality of operation switches 25. The bending portion 12 bends in accordance with turning of the bending operation dial 21. The operation switches 25 are electronic switches that operate the image pickup unit 40 and the like. The operation lever 24 is an operation member of a transformation unit 60 (restriction device) which will be described later.

The processor 7 including a CPU processes an image pickup signal outputted from the image pickup unit 40 and transmits an image signal to the monitor 6. The monitor 6 displays an endoscope image. The processor 7 includes a light source that emits illumination light. The light source may be included in a light source unit separate from the processor 7.

The operation section 20 has an insertion opening H50A which is an opening of a channel 50 (FIG. 2) which is a conduit that allows insertion through the insertion section 10. The treatment instrument 9 such as a forceps has an end effector for performing a treatment and a shaft body provided on a rear end of the end effector. The treatment instrument 9 is inserted from the insertion opening H50A into the channel 50 which is a conduit and inserted through the channel 50, and the end effector protrudes from an opening H50B of the distal end portion 11.

The suction apparatus 8 is a suction pump that suctions a fluid such as blood with air from the inside of the body. The fluid suctioned from the opening H50B of the distal end portion 11 is discharged from an opening of a side tube of a T-tube disposed at the insertion opening H50A of the operation section 20 by way of the channel 50.

In order to efficiently perform suctioning, the inner diameter of the channel 50 may be large. However, when the inner diameter of the channel 50 is large with respect to the outer diameter of the shaft body of the treatment instrument 9, the position of the treatment instrument 9 protruding from the opening H50B is not stable. It may therefore not be easy to guide the treatment instrument 9 to a target position. In addition, the treatment instrument 9 protruding from the channel 50 may sway or the like, which may degrade operability.

<Configuration of Distal End Portion>

Figure 2:
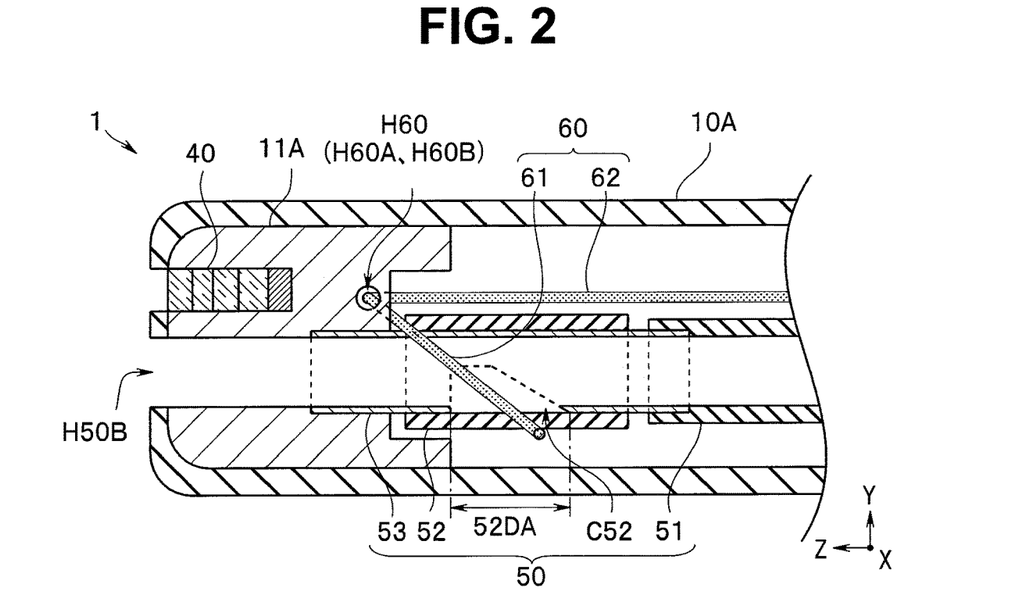
FIG. 2 is a side cross-sectional view of a distal end portion of an endoscope of a first embodiment.
Figure 3:
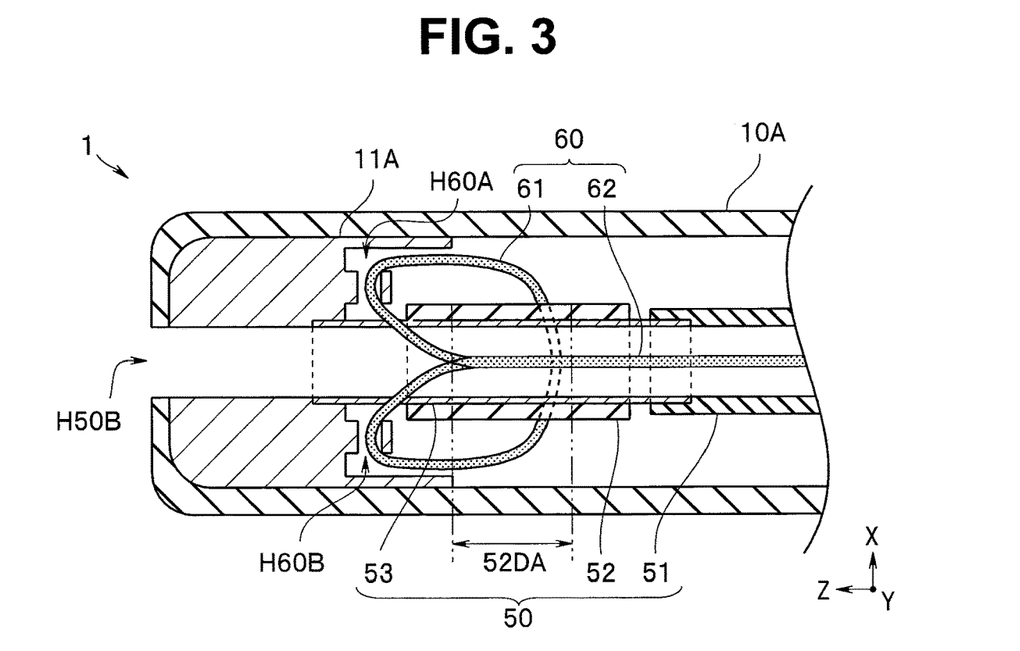
FIG. 3 is a top cross-sectional view of the distal end portion of the endoscope of the first embodiment.

FIG. 2 shows a first plane (Y-Z plane) including the channel 50 of the distal end portion 11 and an operation wire 62. FIG. 3 is a top view of the distal end portion 11, and shows a second plane (X-Z plane) orthogonal to the first plane.

A distal end configuration member 11A which is a principal member of the distal end portion 11 of the endoscope 1 is a rigid member made of metal or resin. A portion of the distal end configuration member 11A is covered by a resin cover 10A. External surfaces of the bending portion 12 and the flexible tube 13 are also covered by the resin cover 10A.

The channel 50 has a rigid pipe 53, a channel tube 51 provided in a manner coupled to the pipe 53 and made of flexible resin, and an elastic tube 52 which is a transformable member. The pipe 53 is attached to the distal end configuration member 11A. The channel tube 51 and the elastic tube 52 are provided in a manner coupled to the pipe 53.

The channel 50 has the opening H50B of the distal end configuration member 11A. The pipe 53 is made of a rigid material such as stainless steel. The pipe 53 has a cutout C52. The elastic tube 52 disposed on the distal end side of the channel 50 covers a region in which the cutout C52 of the pipe 53 is formed.

The elastic tube 52 is made of flexible resin that is changed in shape by an external force, but when the force is removed, recovers again to an original state (a cylindrical shape in a natural state).

The elastic tube 52 is made of silicone rubber having an elastic modulus (Young's modulus) of 5 MPa. The elastic modulus is measured at a room temperature (25° C.) in compliance with JIS K6250. The elastic tube 52 may be flexible silicone resin, flexible polyester resin, flexible vinyl chloride resin, rubber, or the like having an elastic modulus of more than 1 MPa and less than 50 MPa. It is particularly preferable that the elastic tube 52 be an elastomer having rubber elasticity, such as urethan rubber, silicone rubber, or fluorinated rubber.

The channel tube 51 is made of a material having flexibility but being more rigid than the material of the elastic tube 52, such as fluorine resin having an elastic modulus of 500 MPa.

The region of the elastic tube 52 that covers the cutout C52 is a transformation region 52DA that transforms when receiving an external force.

In the transformation region 52DA of the elastic tube 52, a wire 61 which is a long member of the transformation unit 60 is hung. The wire 61 is inserted through two holes H60 (H60A, H60B) which are guides of the distal end configuration member 11A and is provided to extend in a proximal end direction. In other words, as shown in FIG. 3, a part of the wire 61 configures an annular member hung in the transformation region 52DA.

Both ends of the annular wire 61 are connected to a single wire 62 which is a long member of the transformation unit 60, inserted through the insertion section 10, and provided to extend to the operation section 20. Both the ends of the wire 61 may be provided to extend to the operation section 20. The wire 61 is made of metal or rigid resin.

Although not shown, an operation conversion unit is disposed in the operation section 20. The operation conversion unit converts the turning operation of the operation lever 24 which is the operation member of the transformation unit 60 into a movement of pulling the wire 62. The operation conversion unit has a configuration substantially the same as the configuration of a raising base operation member disposed in the operation section of the endoscope having a treatment instrument raising base (forceps elevator) in the distal end portion 11.

Figure 4:
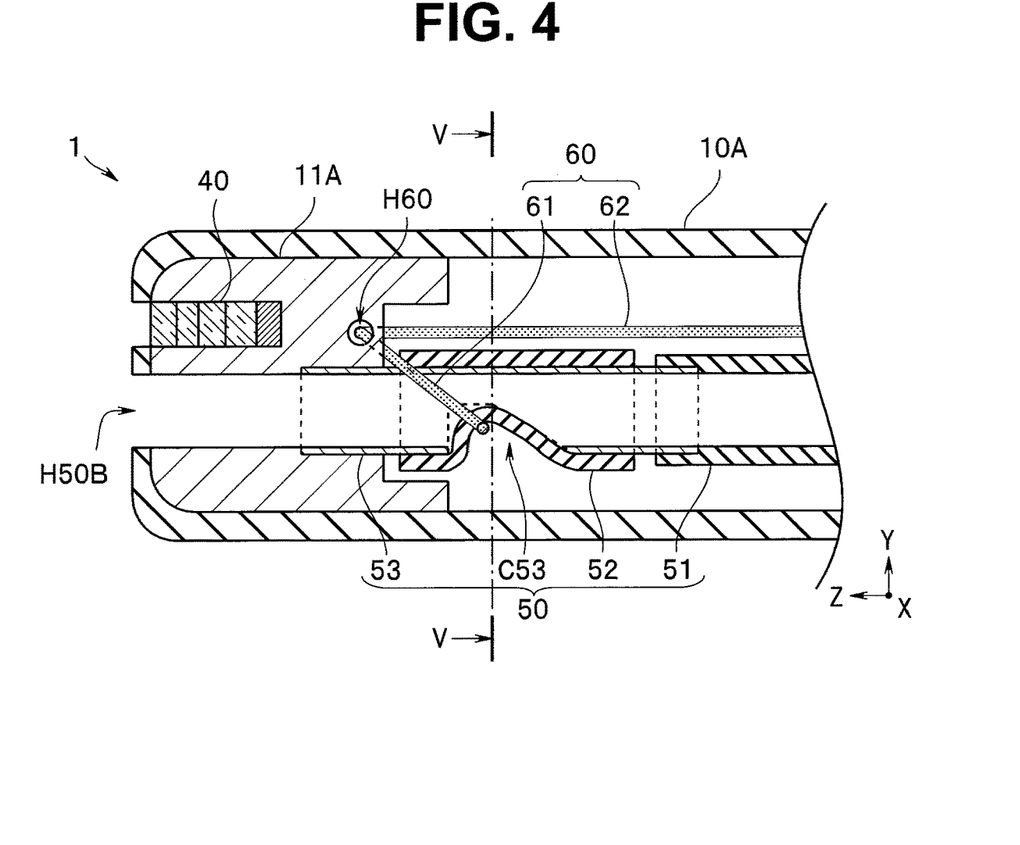
FIG. 4 is a side cross-sectional view of the distal end portion of the endoscope of the first embodiment.
Figure 5:
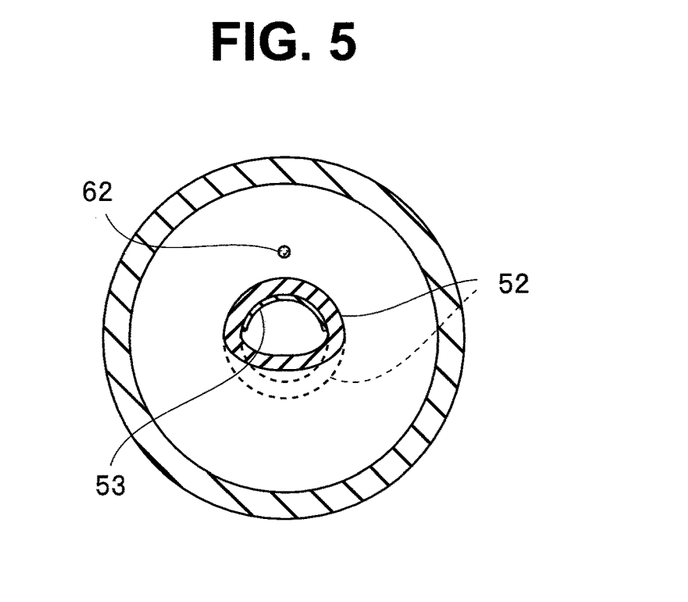
FIG. 5 is a cross-sectional view of the distal end portion of the endoscope of the first embodiment.

In the transformation unit 60 of the endoscope 1, the wire 62 which is the long member is pulled when the operation lever 24 is turned. Then, as shown in FIG. 4, the annular wire 61 applies a stress to an external surface of a transformation region C53 of the elastic tube 52. Then, as shown in FIG. 5, the elastic tube 52 transforms. In other words, the elastic tube 52 is changed in shape of a cross-section orthogonal to a long axis, which reduces a cross-sectional area of the cross-section. When the operation lever 24 returns to the initial position, the elastic tube 52 returns to the cylindrical shape which is the shape in the natural state before transformation by virtue of an elastic force.

Since the inner diameter of the channel 50 is large, the endoscope 1 has a high suction efficiency even if severe bleeding occurs unexpectedly, and thus can complete a suctioning treatment in a short time period. In addition, the transformation region 52DA of the channel 50 is transformed by operation of the transformation unit 60.

Therefore, even if the inner diameter of the channel 50 before transformation is large with respect to the outer diameter of the shaft body of the treatment instrument 9, the position of the treatment instrument 9 protruding from the opening H50B can be stable by transforming the elastic tube 52.

In other words, because of having the transformation unit 60 that transforms the shape of the channel 50, the endoscope 1 is not reduced in suction efficiency and has good operability.

Note that the transformation unit may have a motor that pulls the wire 62, and a switch that controls power supply to the motor may be the operation member. In the present embodiment, the channel cross-sectional shape is circular, but the channel cross-sectional shape may be a shape such as various oval shapes such as an ellipse, an elongated circle, and a shape partially including an arc.

Modifications of First Embodiment

Endoscopes 1A to 1E which are insertion devices of modifications of the first embodiment which will be described below are similar to the endoscope 1 and have the same effects. Thus, components having the same function are denoted by the same reference character, and description will be omitted. Note that the elastic tube is not depicted in FIG. 6 and FIG. 7 below.

Modification 1 of First Embodiment

Figure 6:
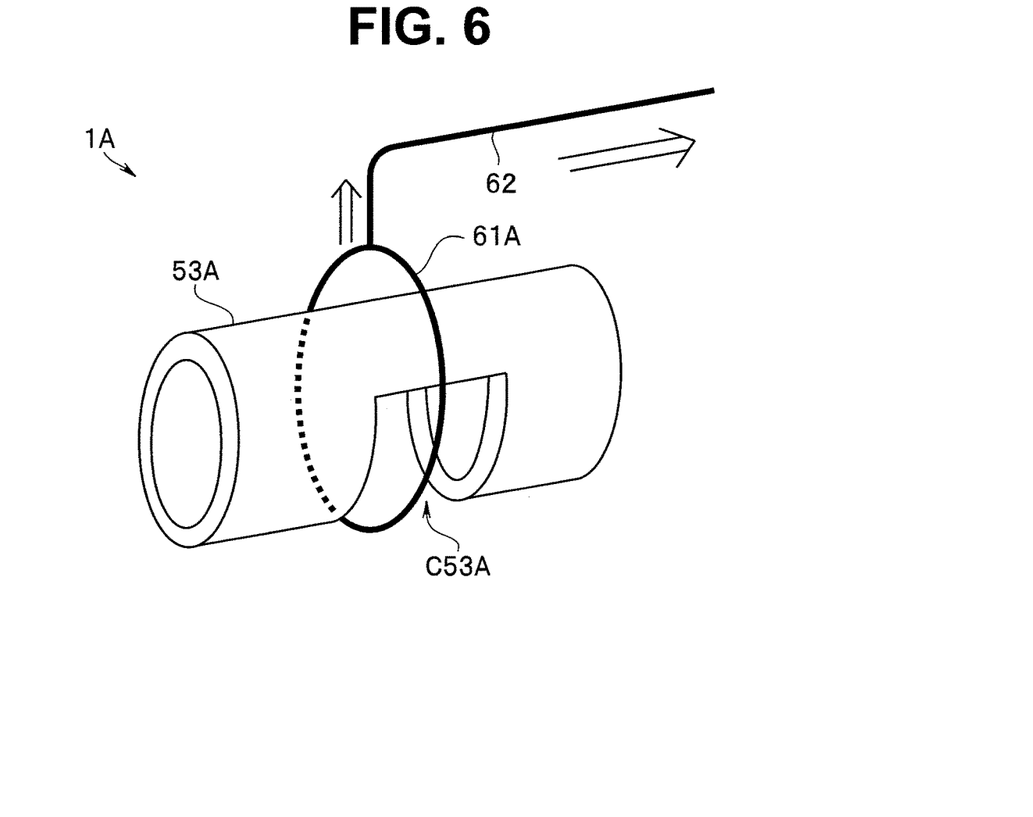
FIG. 6 is a schematic view of a configuration of a transformation unit of an endoscope of Modification 1 of the first embodiment.

In the endoscope 1A of the present modification shown in FIG. 6, an annular wire 61A is hung on a cutout C53A of a pipe 53A. The annular wire 61A is connected to the wire 62. The wire 62 is provided to extend to the proximal end side by way of a beam (guide) provided to extend from the distal end configuration member 11A not shown.

When the operation lever 24 of the operation section 20 is turned, the wire 62 which is the long member is pulled. Since the annular wire 61A is then lifted up, an elastic tube (not shown) that covers the cutout C53A transforms, so that a space inside is reduced in cross-sectional area.

Modification 2 of First Embodiment

Figure 7:
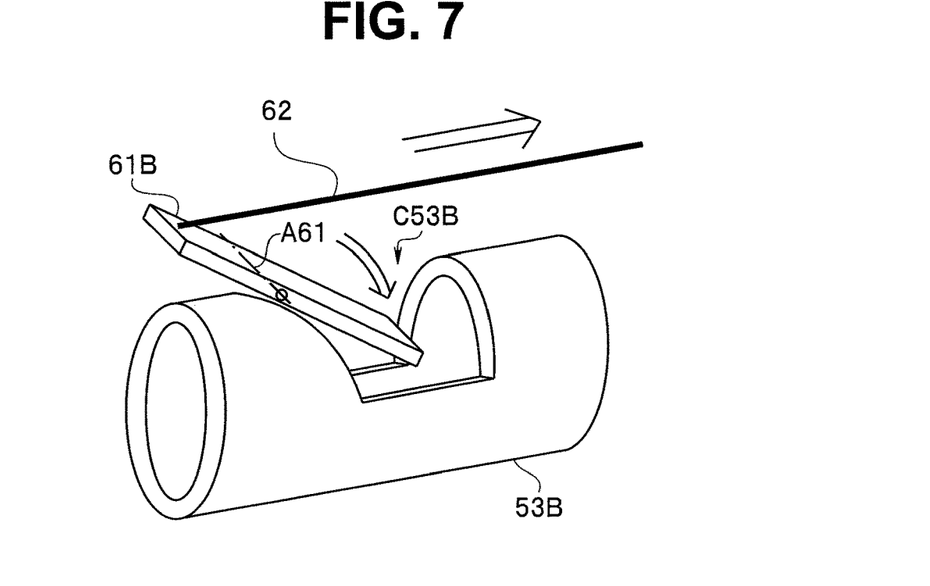
FIG. 7 is a schematic view of a configuration of a transformation unit of an endoscope of Modification 2 of the first embodiment.

In the endoscope 1B of the present modification shown in FIG. 7, a transformation unit 60B (restriction device) has a plate-like member 61B supported on a rotation axis A61. The wire 62 is connected to one end of the plate-like member 61B.

When the operation lever 24 of the operation section 20 is turned, the wire 62 which is the long member is pulled. Then, the plate-like member 61B rotates to press an elastic tube (not shown) that covers a cutout C53B, so that a space inside is reduced in cross-sectional area.

The endoscopes 1A and 1B of the modifications have the same effects as the effects of the endoscope 1. In other words, the shape of the cutout in the pipe 53A, the configuration of the guides of the distal end configuration member 11A, the configuration of a distal end portion of the long member, and the like are not limited to the configuration of the first embodiment.

Modification 3 of First Embodiment

Figure 8:
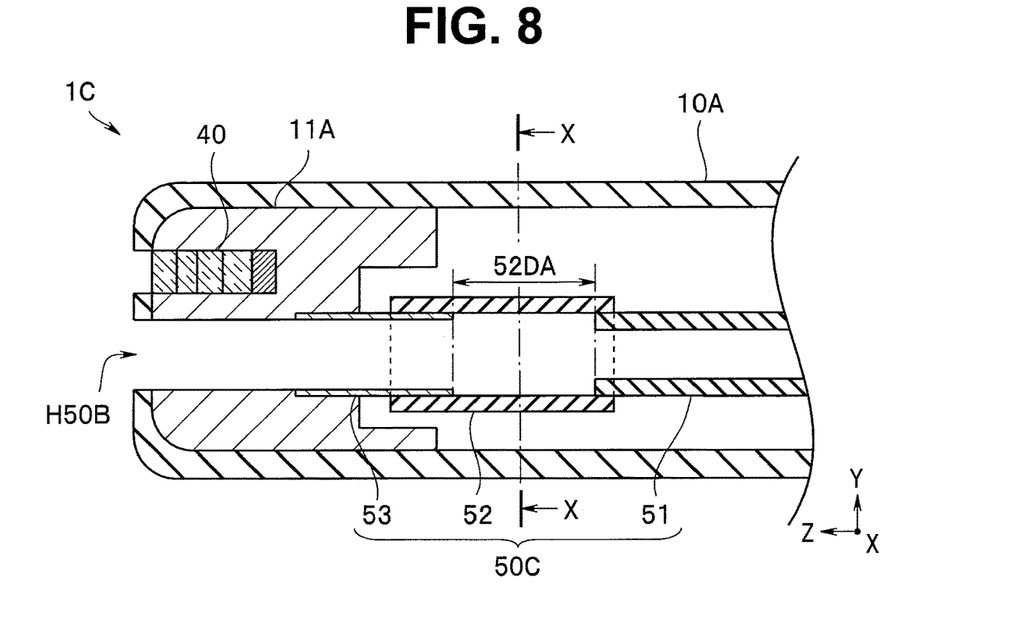
FIG. 8 is a side cross-sectional view of a distal end portion of an endoscope of Modification 3 of the first embodiment.

In a transformation unit 50C (restriction device) of the endoscope 1C of the present modification shown in FIG. 8, the elastic tube 52 connects the pipe 53 and the channel tube 51.

Figure 9:
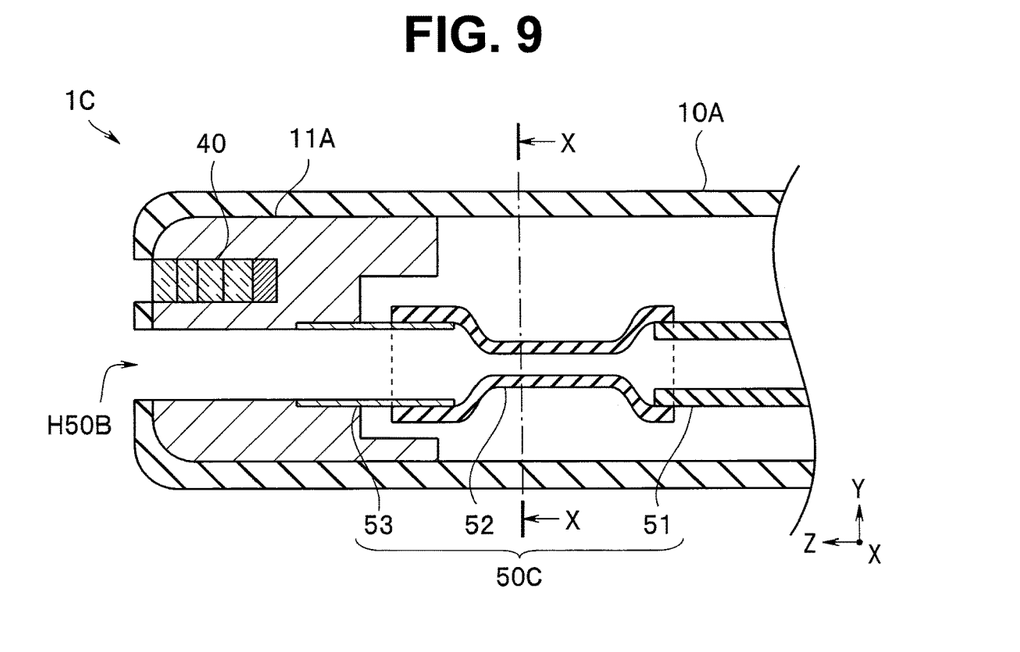
FIG. 9 is a side cross-sectional view of a distal end portion of an endoscope of Modification 4 of the first embodiment.
Figure 10:
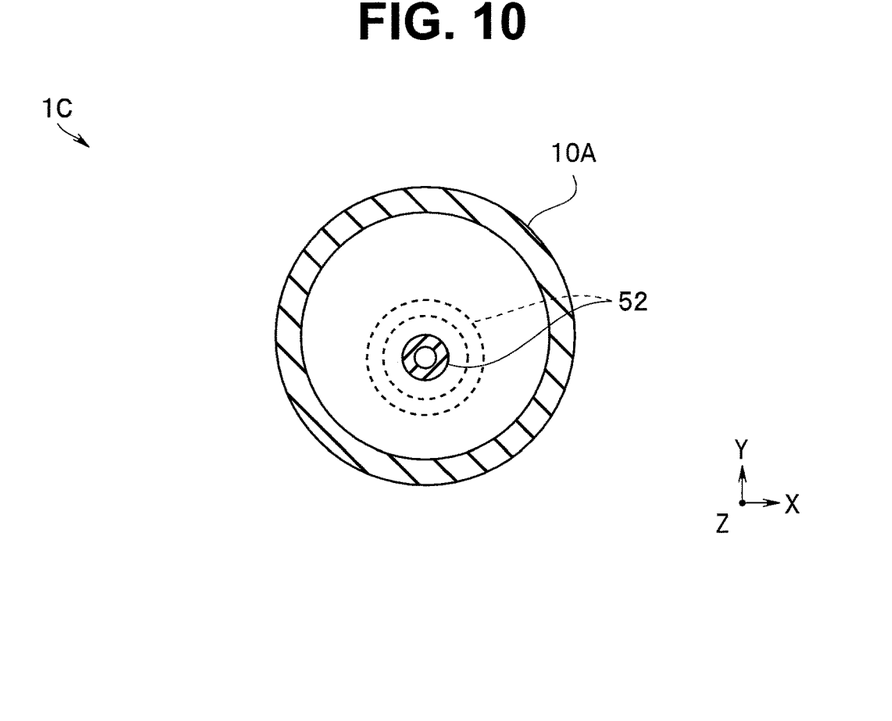
FIG. 10 is a cross-sectional view of the distal end portion of the endoscope of Modification 4 of the first embodiment.

In the endoscope 1C, the channel tube 51 is pulled by the turning movement of the operation lever 24 of the operation section 20. Then, as shown in FIG. 9 and FIG. 10, a tensile stress is applied to the elastic tube 52, and the elastic tube 52 in the transformation region 52DA decreases in diameter.

The endoscope 1C has a configuration simpler than the configurations of the endoscope 1 and the like.

Modification 4 of First Embodiment

Figure 11:
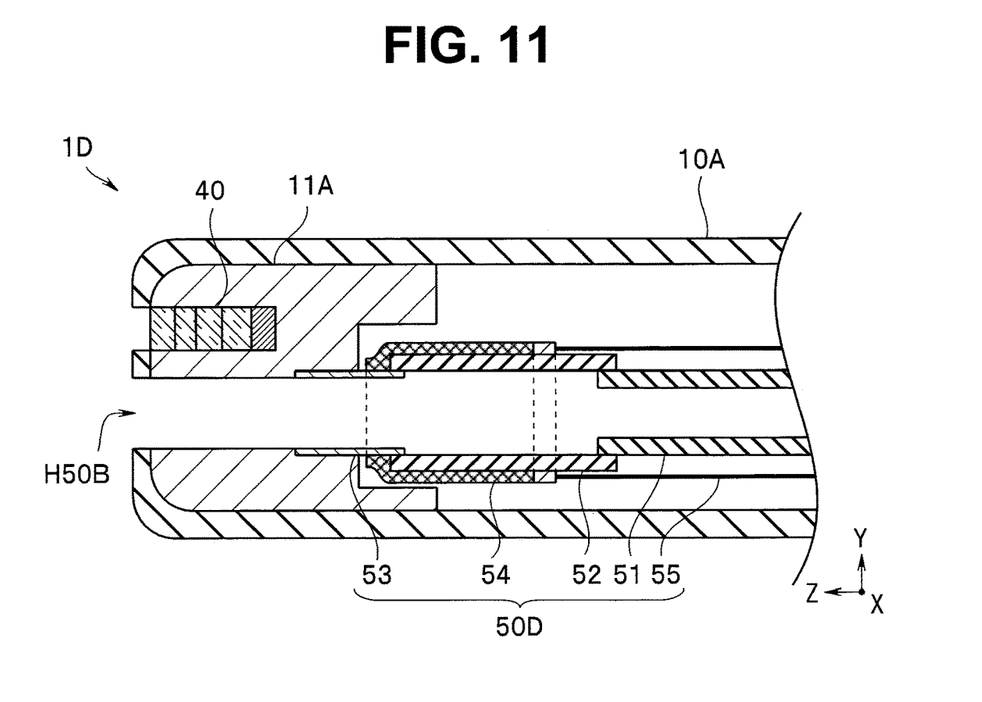
FIG. 11 is a side cross-sectional view of a distal end portion of an endoscope of Modification 5 of the first embodiment.

In a transformation unit 50D (restriction device) of the endoscope 1D of the present modification shown in FIG. 11, the elastic tube 52 connects the pipe 53 and the channel tube 51. A net tube 54 having a distal end and a rear end covers the elastic tube 52. The distal end of the net tube 54 is fixed to the pipe 53. A wire 55 which is a long member is connected to the rear end of the net tube 54.

Figure 12:
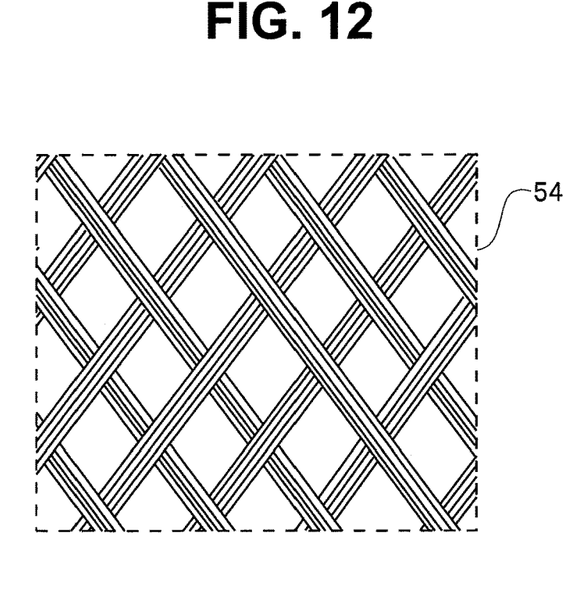
FIG. 12 is a schematic view of a net tube of the endoscope of Modification 5 of the first embodiment.

As shown in FIG. 12, the net tube 54 is formed by braiding an array of a plurality of thin lines made of metal or resin. Stainless steel, copper alloy, or fluorine resin, for example, may be used as the material that configures the thin lines. In addition, metal thin lines may be covered by resin. When a tensile stress is applied, the net tube 54 decreases in diameter.

Figure 13:
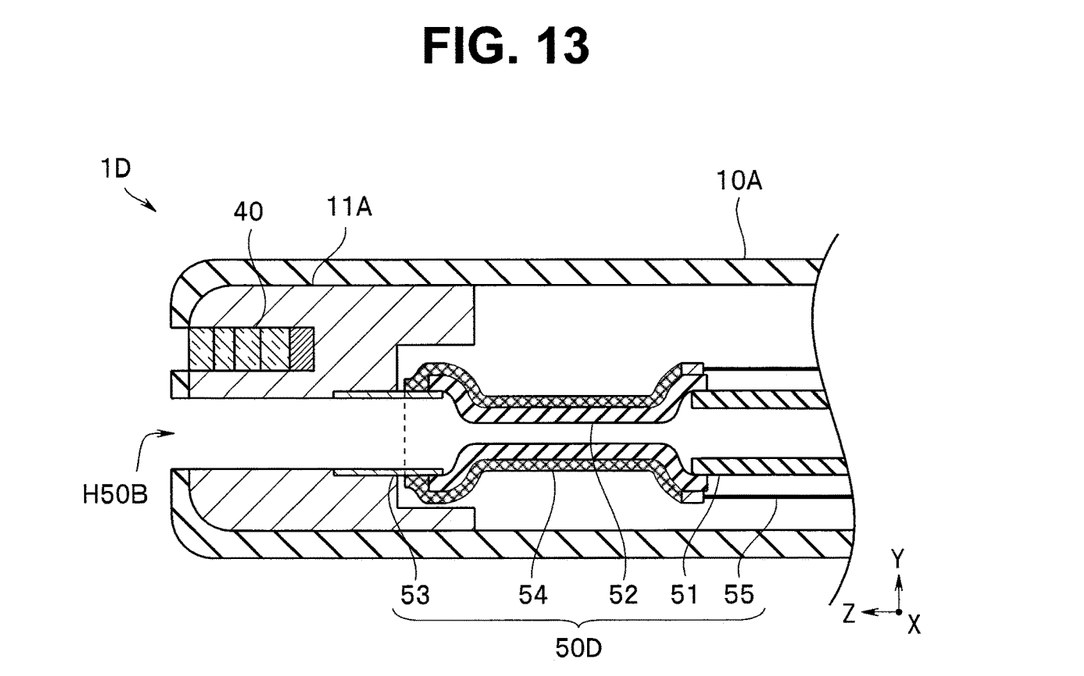
FIG. 13 is a side cross-sectional view of the distal end portion of the endoscope of Modification 5 of the first embodiment.

The wire 55 is pulled by the turning movement of the operation lever 24 of the operation section 20. Then, as shown in FIG. 13, a tensile stress is applied to the net tube 54, and the net tube 54 decreases in diameter. Then, the elastic tube 52 also decreases in diameter. When the tensile stress is no longer applied to the net tube 54, not only the elastic tube 52 but also the net tube 54 return to diameters before transformation by virtue of the elastic force of the elastic tube 52.

The endoscope 1D is less likely to cause damage to the elastic tube 52 than the endoscope 1C.

Modification 5 of First Embodiment

Figure 14:
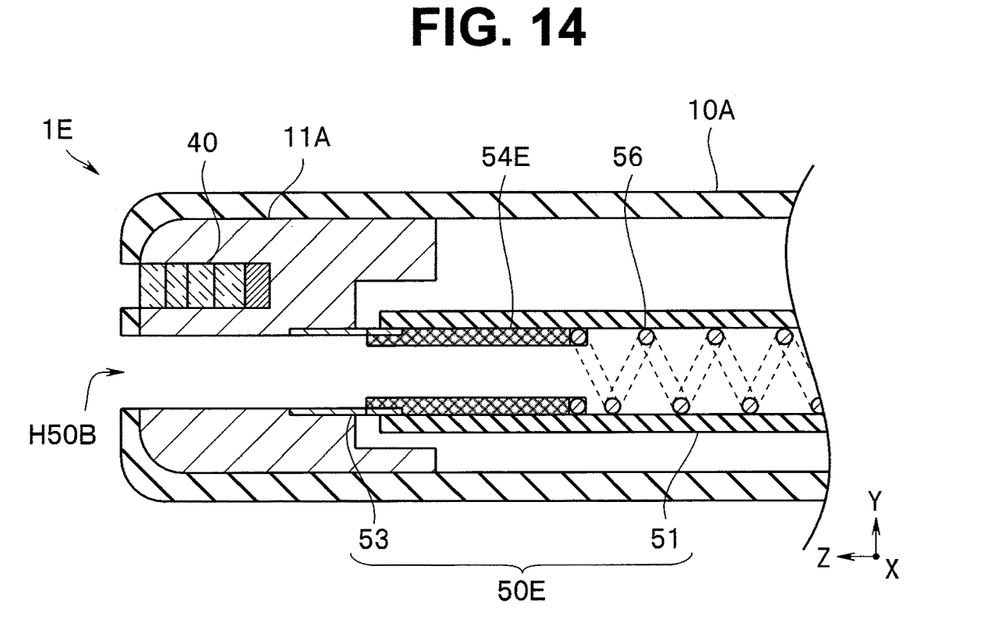
FIG. 14 is a side cross-sectional view of a distal end portion of an endoscope of Modification 6 of the first embodiment.
Figure 15:
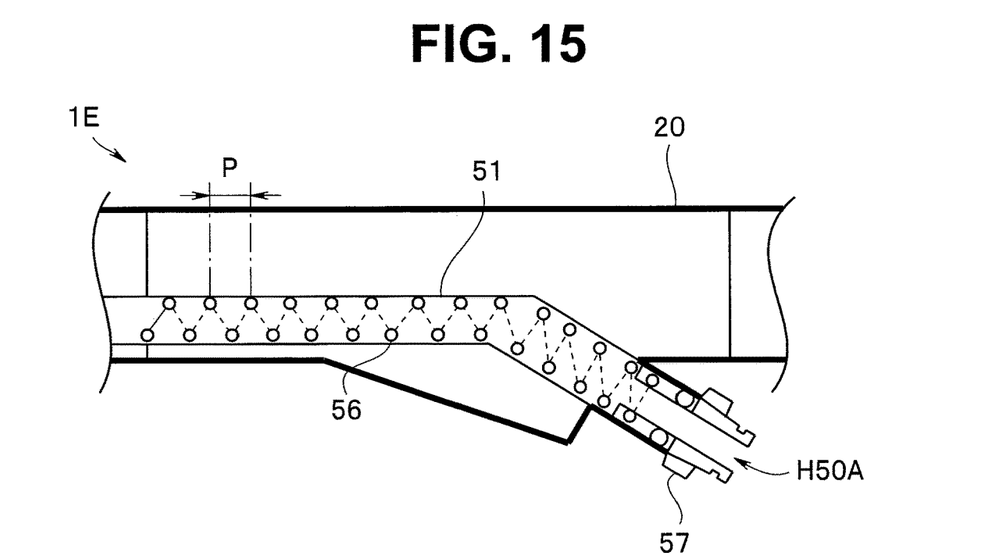
FIG. 15 is a side cross-sectional view of an operation section of the endoscope of Modification 6 of the first embodiment.

A transformation unit 50E (restriction device) of the endoscope 1E of the present modification is shown in FIG. 14 and FIG. 15. In the endoscope 1E, a net tube 54E which is a transformation region is disposed inside the channel tube 51. A distal end of the net tube 54E is fixed to the pipe 53. A distal end of a coil spring 56 which is a helical member is connected to a rear end of the net tube 54E. A rear end of the coil spring 56 that is inserted through the insertion section 10 is connected to a rotation member 57 provided at the insertion opening H50A of the operation section 20.

A winding pitch P of the coil spring 56 on which a thin line made of stainless steel, for example, is wound is made shorter when the rotation member 57 is subjected to a rotation operation in a winding direction. A tensile stress is thus applied to the net tube 54E, and the net tube 54E decreases in diameter. The winding pitch P of the coil spring 56 is made longer when the rotation member 57 is subjected to a rotation operation in a direction opposite to the winding direction. A compression stress is thus applied to the net tube 54E, and the net tube 54E returns to an original diameter.

In the endoscope 1E, the coil spring 56 is the long member, and the rotation member 57 is the operation member.

In the endoscope 1E, the treatment instrument 9 is fixed by the net tube 54E inside the channel tube 51. The endoscope 1E thus enables the treatment instrument 9 to be fixed in a manner more stable than the endoscope 1 and the like.

Second Embodiment

An endoscope system 2F which is an insertion device of the present embodiment is similar to the endoscope system 2. Thus, components having the same function are denoted by the same reference character, and description will be omitted.

Figure 16:
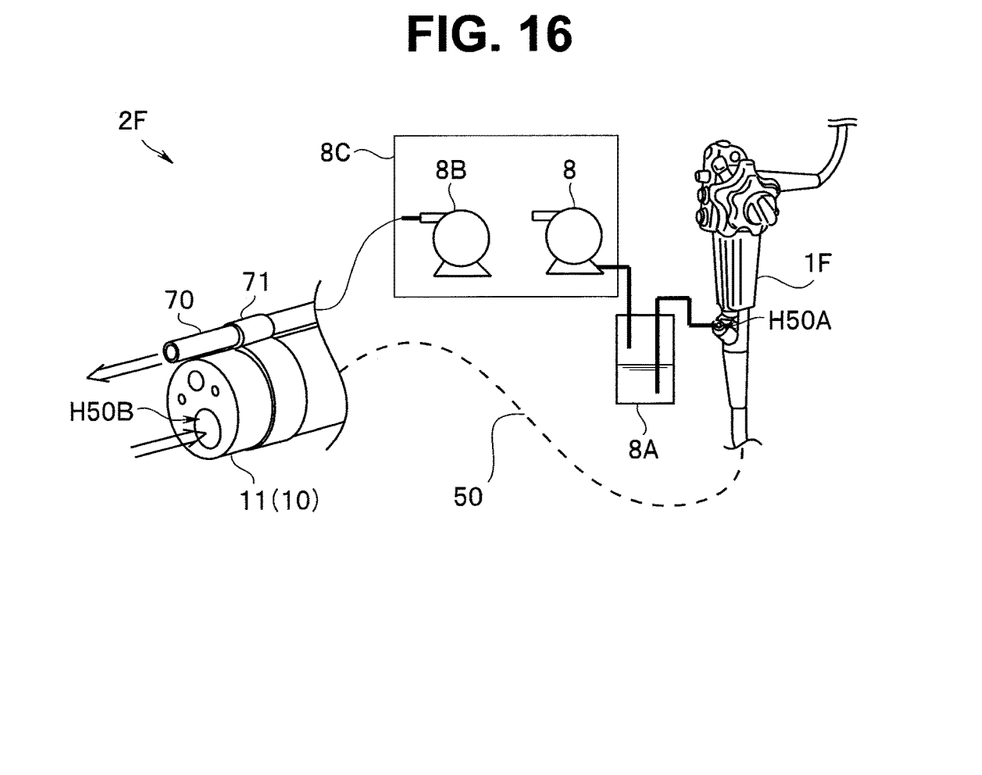
FIG. 16 is a configuration diagram of an endoscope system including an endoscope of a second embodiment.

The endoscope system 2F shown in FIG. 16 includes an air feeding tube 70 which is a second tube and a fluid supply apparatus 8B in addition to the configuration of the endoscope system 2.

The air feeding tube 70 is arranged on an external surface of the insertion section 10 in parallel to the channel tube 51 which is a first tube. The air feeding tube 70 is fixed to the distal end portion 11 of the insertion section 10 with a belt 71. The channel tube 51 that allows insertion through the insertion section 10 is connected to the suction apparatus 8. The air feeding tube 70 is connected to the fluid supply apparatus 8B that supplies a fluid to the inside of the body.

As already described, the suction apparatus 8 suctions a fluid such as blood with air from the inside of the body. In a case where severe bleeding occurs, efficient suctioning is required. However, a large amount of suctioning causes a negative pressure, and an observation space is reduced. In the endoscope system 2F, the fluid supply apparatus 8B and the suction apparatus 8 operate at the same time to circulate a fluid between the inside and the outside of the subject. A liquid such as blood suctioned by the suction apparatus 8 is collected in a collection apparatus 8A. The endoscope system 2F can prevent the observation space from being narrowed by supplying a fluid such as air from the fluid supply apparatus 8B to the inside of the body by way of the air feeding tube 70.

In other words, when the suction apparatus 8 suctions a predetermined volume of fluid, the fluid supply apparatus 8B supplies a fluid of substantially the same volume as the predetermined volume. Thus, the endoscope system 2F has good operability.

Note that the fluid supply apparatus 8B and the suction apparatus 8 may be an integral pump 8C. In other words, the endoscope system 2F may include the pump 8C having a suction tube connected to the channel tube 51 and a discharge pipe connected to the air feeding tube 70. The pump 8C serves both as the fluid supply apparatus 8B and the suction apparatus 8.

Modifications of Second Embodiment

Endoscope systems which are insertion devices of modifications of the second embodiment are similar to the endoscope system 2F and has the same effects. Thus, components having the same function are denoted by the same reference character, and description will be omitted.

Modification 1 of Second Embodiment

Figure 17:
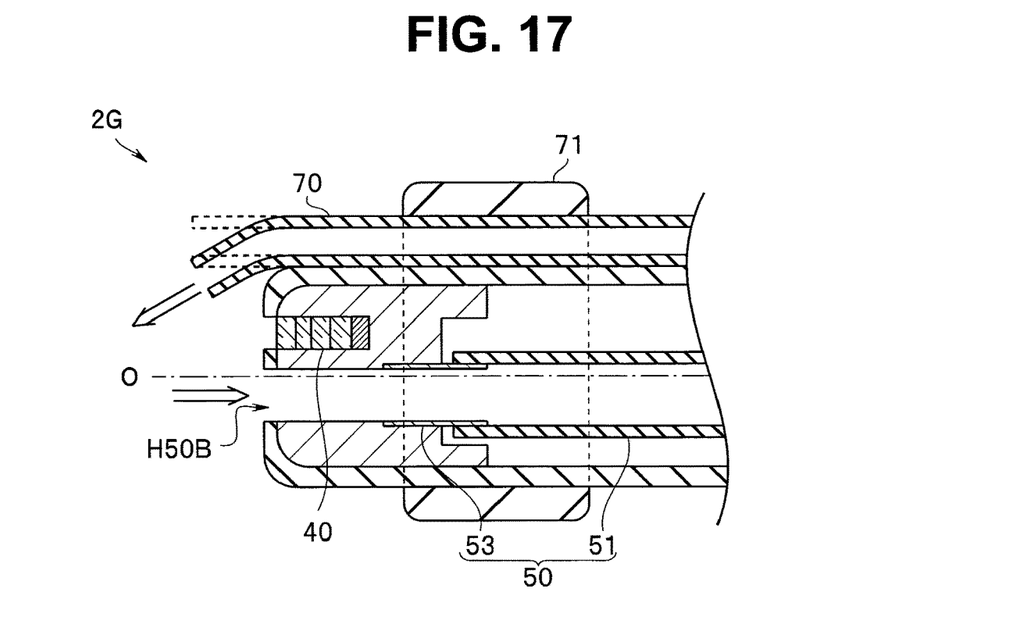
FIG. 17 is a side cross-sectional view of a distal end portion of an insertion device of the second embodiment.

In an endoscope system 2G of the present modification, the air feeding tube 70 which is a second tube has a distal end arranged to be directed to a direction of a central axis O of the insertion section 10 as shown in FIG. 17. For example, the air feeding tube 70 is a double lumen tube having two conduits, and the distal end of the air feeding tube 70 can be tilted in a desired direction by inserting a metal wire having a curved distal end into a distal end portion of a small-diameter conduit to transform a distal end portion of the double lumen tube into a curved state.

The endoscope system 2G can remove blood or the like present in a visual field direction of the image pickup unit 40 with a fluid ejected from the air feeding tube 70, and thus facilitates observation. Since the removed blood moves in a direction of the opening H50B, suction is facilitated.

Modification 2 of Second Embodiment

Figure 18:
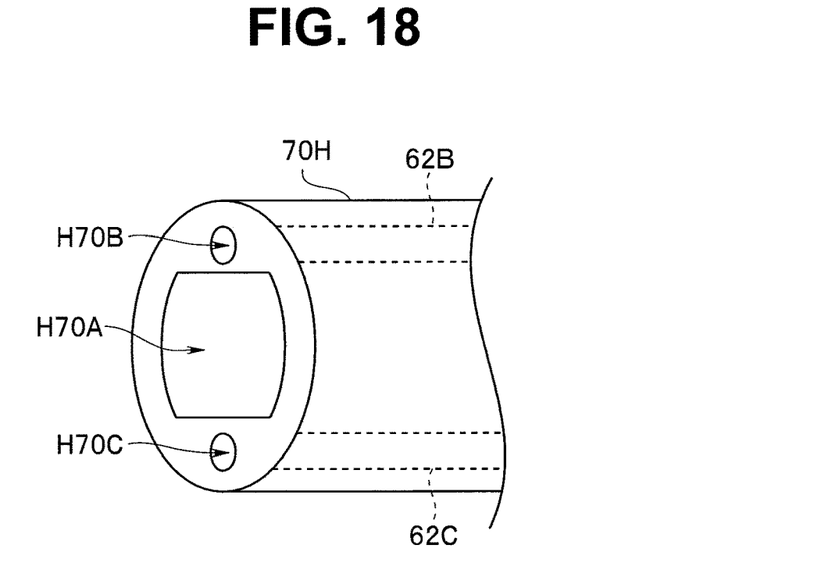
FIG. 18 is a cross-sectional view of a second tube of the insertion device of the second embodiment.

In an endoscope system 2H of the present modification, an air feeding tube 70H which is the second tube is a multi-lumen tube having three conduits H70A to H70C as shown in FIG. 18. The two conduits H70B and H70C are arranged at rotationally symmetric positions with respect to a central axis of the air feeding tube 70H.

A wire 62C which is an elastic metal wire having a curved distal end is inserted in the conduit H70C. Thus, the air feeding tube 70H is arranged with a distal end tilted to be directed to the direction of the central axis O of the insertion section 10 similarly to the endoscope system 2G.

On the other hand, a wire 62B which is a long member extending in a longitudinal axis direction of the insertion section 10 is inserted in the conduit H70B. The wire 62B has a distal end fixed on the distal end side of the second tube 70H. The wire 62B has a rear end connected to the operation lever 24 which is the operation member that provides the wire 62B with a pulling force in accordance with operation from the outside.

When the wire 62B is pulled, the distal end of the air feeding tube 70H is directed to a direction opposite to the direction of the central axis O of the insertion section 10. In other words, the wire 62C and the operation lever 24 configure an ejection operation unit 60H that operates a fluid ejecting direction.

The endoscope system 2H can change the fluid ejecting direction, and thus facilitates cleaning with a fluid.

Note that the conduit H70C may also allow insertion of a wire to be pulled in accordance with operation of the operation section 20. Alternatively, the second tube may have four small-diameter conduits arranged at rotationally symmetric positions with respect to the central axis, each of which may allow insertion of a wire to be subjected to the pulling operation.

Modification 3 of Second Embodiment

An endoscope system 2J which is an insertion device of the present modification has an opening transformation unit 69 (restriction device) that changes the shape of the opening H70 of a second tube 70J through which a fluid is ejected by operation of the operation section 20.

Figure 19A:
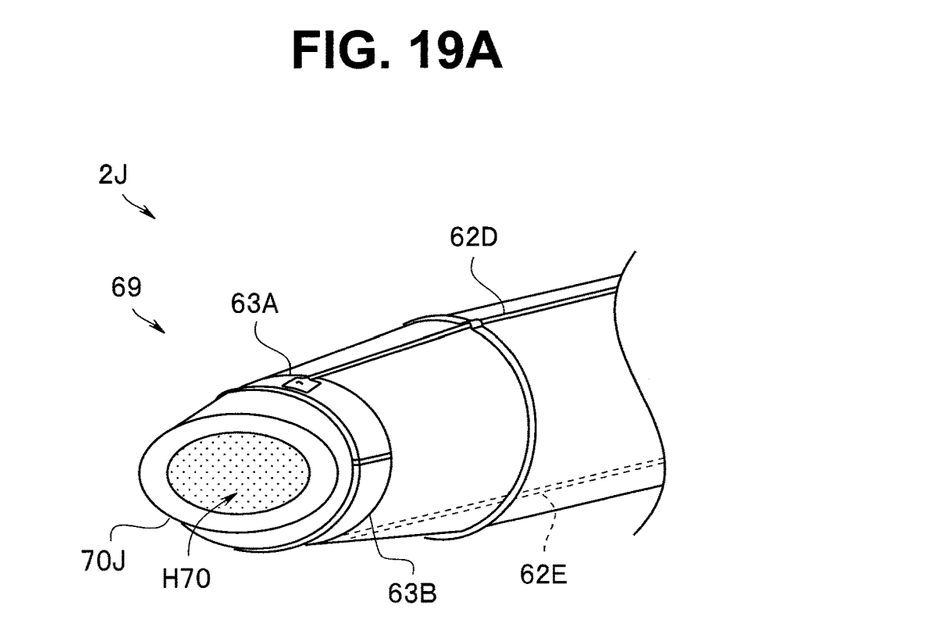
FIG. 19A is a configuration diagram of a distal end of a second tube of an insertion device of Modification 1 of the second embodiment.

As shown in FIG. 19A, two leaf springs 63A and 63B are arranged facing each other at the opening H70 of the second tube 70J. The leaf spring 63A is connected to a first end of a wire 62D, and the leaf spring 63B is connected to a first end of a wire 62E. Second ends of the wires 62D and 62E are connected to the operation lever (not shown) which is the operation member that provides the wires 62D and 62E with pulling forces.

Figure 19B:
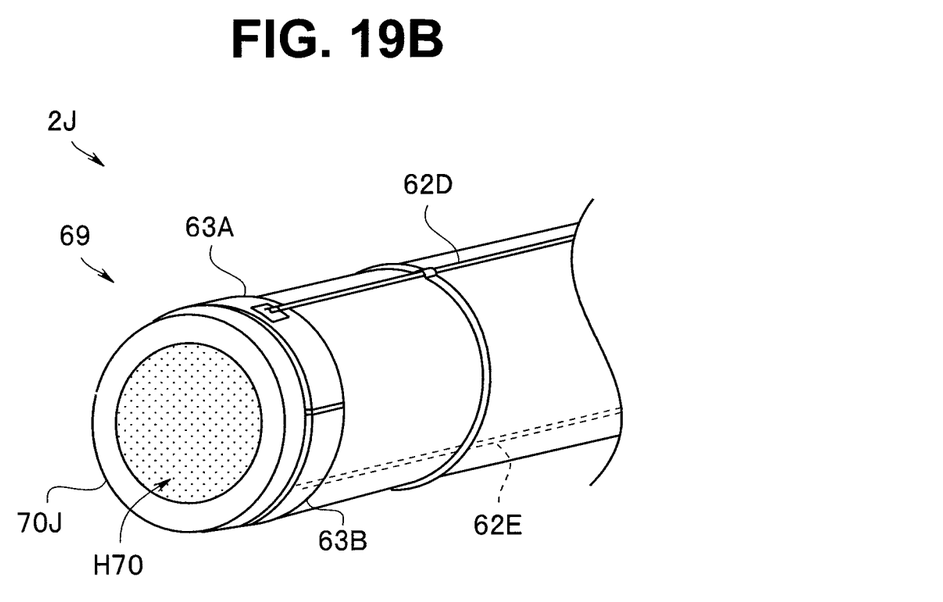
FIG. 19B is a configuration diagram of the distal end of the second tube of the insertion device of Modification 1 of the second embodiment.

When the wires 62D and 62E are pulled, the opening H70 having been narrowed by elastic forces of the leaf springs 63A and 63B are enlarged as in FIG. 19B. When the pulling forces on the wires 62D and 62E are relaxed, the opening H70 having been enlarged is narrowed as in FIG. 19A. In other words, the leaf springs 63A, 63B, the wires 62D, 62E, and the operation lever 24 configure the opening transformation unit 69 that changes the shape of the opening through which a fluid is ejected.

Since the endoscope system 2J can change the shape of the opening H70 of the second tube 70J through which a fluid is ejected, a fluid ejecting pressure and a spreading status of the ejected fluid can be changed. Thus, the endoscope system 2J has good operability.

Although the endoscope 1 is mainly considered as an insertion device in the above embodiments, a catheter or the like having a channel and an operation section and used for insertion of a treatment instrument may be adopted. The endoscope 1 is a single-use endoscope to be disposed of after being used once, but may be a re-use endoscope to be repeatedly used. The endoscope 1 is a flexible endoscope having flexibility in the insertion section 10, but may be a rigid endoscope having a rigid straight tube as the insertion section. Moreover, the endoscope 1 and the like are not limited to a medical use but may be for an industrial use.

The present disclosure is not limited to the embodiment explained above. Various changes, alterations, and the like are possible within a range not changing the gist of the disclosure.

1. An insertion device comprising:
    an insertion section inserted into a subject, the insertion section including a distal end configuration member on a distal end;
    an operation section disposed on a proximal end side of the insertion section;
    a channel allowing insertion through the insertion section and communicating with the distal end configuration part, the channel including a transformable member on a distal end side; and
    a transformation unit configured to change a shape of the transformable member by operation of the operation section.
2. The insertion device according to example 1, wherein the transformable member is an elastic tube, and
    the transformation unit includes an operation member disposed in the operation section and a long member configured to transfer operation of the operation member to the transformable member.
3. The insertion device according to example 2, wherein the transformation unit changes a cross-sectional shape of the transformable member.
4. The insertion device according to example 2, wherein the transformation unit applies a stress to an external surface of the transformable member by operation from the operation section.
5. The insertion device according to example 3, wherein the channel includes a rigid pipe including a cutout and the elastic tube that covers the pipe, and
    the transformation unit applies a stress to an external surface of the elastic tube.
6. The insertion device according to example 5, wherein the transformation unit includes an annular member hung on the elastic tube, and
    the annular member applies a stress to the elastic tube when the long member is pulled by operation of the operation member.
7. The insertion device according to example 6, wherein the long member is inserted through a guide provided in the distal end configuration part, provided to extend to the proximal end side toward the elastic tube, and connected to the annular member.
8. The insertion device according to example 5, wherein the transformation unit includes a plate-like member configured to turn when the long member is pulled by operation of the operation member, and
    the plate-like member applies a stress to the elastic tube.
9. The insertion device according to example 2, wherein the transformation unit decreases an inner diameter of the elastic tube.
10. The insertion device according to example 9, wherein the long member is pulled based on operation of the operation member, and a tensile stress is applied to the elastic tube.
11. The insertion device according to example 10, wherein a distal end side of the elastic tube is connected to a pipe attached to the distal end configuration part, and the long member applies the tensile stress to a proximal end side of the elastic tube.
12. The insertion device according to example 7, further comprising:
    a net tube that covers the elastic tube, wherein
    when the long member is pulled based on operation of the operation member and the net tube decreases in diameter, a stress is applied to the elastic tube.
13. The insertion device according to example 12, wherein a distal end side of the net tube is connected to a pipe attached to the distal end configuration part, and the long member pulls a proximal end side of the net tube.
14. The insertion device according to example 2, wherein a net tube which is the transformable member and a helical member which is the long member are arranged in the channel, and
    the helical member is connected to a rotation member provided in the operation section.
15. The insertion device according to example 14, wherein
    a distal end side of the helical member is connected to the net tube, and
    when a winding pitch of the helical member is changed based on a rotation operation of the rotation member, the helical member pulls the net tube.
16. The insertion device according to example 1, wherein the elastic tube is made of an elastomer having rubber elasticity.
17. The insertion device according to example 1, wherein the insertion device is an endoscope.
18. The insertion device according to example 17, wherein the endoscope is a single-use endoscope disposed of after being used once.

What is claimed is:
1. An insertion device, comprising:
    an insertion section including a distal portion;
    an operation section located on a proximal end side of the insertion section;
    a channel located in the insertion section and communicating with the distal portion, the channel including a transformable tube on a distal end side of the channel; and
    a pulling member,
    wherein operation of the pulling member changes a shape of the transformable tube while a position in a longitudinal direction of a distal opening of the transformable tube is maintained.
2. The insertion device according to claim 1, wherein the transformable tube is an elastic tube,
    wherein the operation section includes an operation unit including an operator and the pulling member, and wherein operation of the pulling member includes movement of the operator to move the pulling member to change the shape of the transformable tube.

3. The insertion device according to claim 2, wherein the shape of the transformable tube that is changeable is a cross-sectional shape of the transformable tube in a direction normal to a longitudinal axis of the transformable tube.

4. The insertion device according to claim 2, wherein operation of the pulling member applies a stress to an external surface of the transformable tube.

5. The insertion device according to claim 2, wherein the channel includes a pipe including a cutout,
wherein the transformable tube covers the pipe, and
wherein operation of the operation unit applies a stress to an external surface of the transformable tube.

6. The insertion device according to claim 5, wherein the pulling member is a wire,
wherein the unit wire includes an annular portion,
wherein the transformable tube passes through the annular portion, and
wherein the stress is applied by the annular portion.

7. The insertion device according to claim 6, wherein the pulling member is inserted through a guide provided in the distal portion of the insertion section, and
wherein the pulling member is connected to the annular member and extends from the annular member toward the proximal end side of the transformable tube.

8. The insertion device according to claim 7, further comprising:
a net tube that covers the transformable tube,
wherein movement of the operator to move the pulling member decreases a diameter of the net tube and applies a stress to the transformable tube.

9. The insertion device according to claim 8, wherein a distal end side of the net tube is connected to the pipe attached to the distal portion of the insertion portion, and
wherein the pulling member pulls a proximal end side of the net tube.

10. The insertion device according to claim 2, further comprising a plate-like member rotatable about an axis, and
wherein the channel includes a pipe including a cutout,
wherein the transformable tube covers the pipe, and
wherein operation of the operation unit applies a stress to an external surface of the transformable tube by the plate-like member.

11. The insertion device according to claim 2, wherein changing the shape of the transformable tube decreases an inner diameter of the transformable tube.

12. The insertion device according to claim 11, wherein operation of the operation unit includes movement of the operator to apply a tensile stress to the transformable tube.

13. The insertion device according to claim 12, wherein a distal end side of the transformable tube is connected to a pipe attached to the distal portion of the insertion portion, and
wherein the pulling member applies the tensile stress to a proximal end side of the transformable tube.

14. The insertion device according to claim 2, wherein the elastic tube is made of an elastomer having a rubber elasticity.

15. The insertion device according to claim 1, wherein the transformable tube is a net tube,
wherein the operation section includes an operation unit including an operator, a rotation member, and the pulling member,
wherein the pulling member is a coil spring arranged in the channel,
wherein the helical member is connected to the rotation member, and
wherein operation of the operation unit includes movement of the operator to move the pulling member to change the shape of the transformable tube.

16. The insertion device according to claim 15, wherein a distal end side of the helical member is connected to the net tube, and
wherein operation of the operation unit includes movement of the operator to rotate the rotation member to change a winding pitch of the helical member to pull the net tube.

17. The insertion device according to claim 1, wherein the insertion device is an endoscope.

18. The insertion device according to claim 17, wherein the endoscope is a single-use endoscope.

19. An insertion device, comprising:
an insertion section including a distal portion;
an operation section located on a proximal end side of the insertion section;
an operation unit located in the operation section;
a channel located in the insertion section and communicating with the distal portion; and
a restriction device acting on a transformable tube, the restriction device located in the distal portion of the insertion section,
wherein the restriction device (i) is located external to and adjacent the channel or (ii) is formed by a part of the channel,
wherein the restriction device is reversibly operable by the operation unit between a first state and a second state, and
wherein, in the first state, movement though the channel is unrestricted and, in the second state, movement through the channel is restricted.

20. An insertion device, comprising:
an insertion section including a distal portion;
an operation section including an operator and a pulling member located on a proximal end side of the insertion section; and
a channel located in the insertion section and communicating with the distal portion, the channel including an elastic tube on a distal end side of the channel;
wherein a cross sectional area of the elastic tube is configured to decrease by moving the pulling member.

* * * * *